April 12, 1932.  P. CAPOCCI  1,853,405

ORNAMENTAL LAMP SHADE

Original Filed April 3, 1929   5 Sheets-Sheet 1

Pompeo Capocci INVENTOR
BY *Victor J. Evans*
ATTORNEY

April 12, 1932. P. CAPOCCI 1,853,405
ORNAMENTAL LAMP SHADE
Original Filed April 3, 1929 5 Sheets-Sheet 2

Pompeo Capocci INVENTOR
BY *Victor J. Evans* ATTORNEY

April 12, 1932. P. CAPOCCI 1,853,405

ORNAMENTAL LAMP SHADE

Original Filed April 3, 1929    5 Sheets-Sheet 3

Pompeo Capocci
INVENTOR

BY Victor J. Evans
ATTORNEY

April 12, 1932. P. CAPOCCI 1,853,405
ORNAMENTAL LAMP SHADE
Original Filed April 3, 1929 5 Sheets-Sheet 4
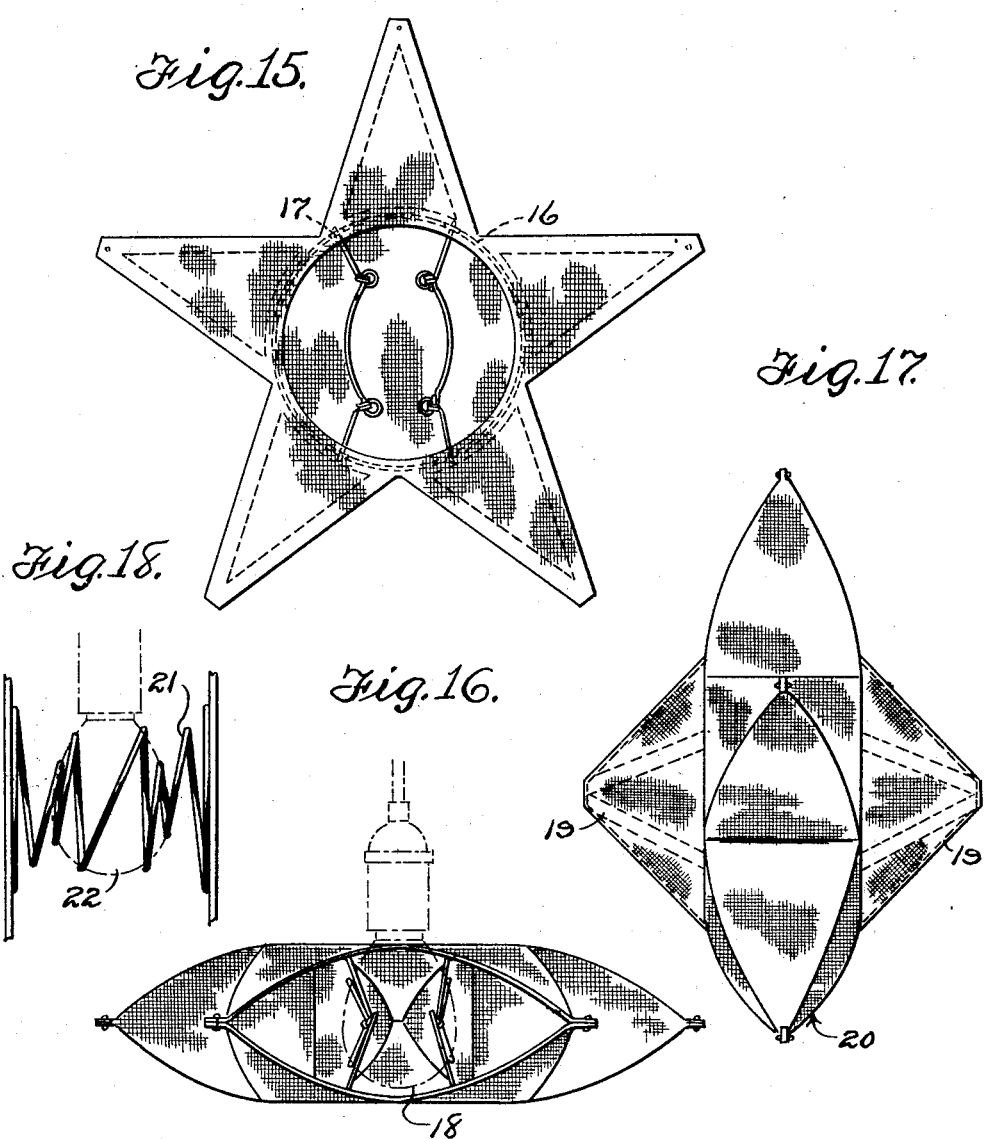
Pompeo Capocci
INVENTOR
BY Victor J. Evans
ATTORNEY April 12, 1932.      P. CAPOCCI      1,853,405
ORNAMENTAL LAMP SHADE Original Filed April 3, 1929     5 Sheets-Sheet 5

Pompeo Capocci
INVENTOR

BY Victor J. Evans
ATTORNEY

Patented Apr. 12, 1932

1,853,405

UNITED STATES PATENT OFFICE

POMPEO CAPOCCI, OF HOLLANDALE, FLORIDA, ASSIGNOR OF ONE-HALF TO ANGELO CAMMARATA, OF HOLLYWOOD, FLORIDA

ORNAMENTAL LAMP SHADE

Application filed April 3, 1929, Serial No. 352,281. Renewed July 6, 1931.

The object of this, my present invention, is the provision of an ornamental shade for electric bulbs which may be employed as a Christmas ornament or a shade for soft lights when desired such as in boudoirs, sleeping or sick rooms, etc.

A further object is to simplify and improve the construction of this type of lamp shades upon which I have applied for U. S. Letters Patent on Nov. 7, 1928, application Serial No. 317,764.

A further object is the provision of an ornamental lamp shade in which two frame members are provided with pointed ends which are loosely connected, the said frame members being covered by a translucent fabric and designed to normally rest against each other, the said frame members having arranged therebetween expansible spring means which frictionally engage with a lamp bulb to support the frame thereon as well as means for forcing the central portion of the frame sections away from each other, and likewise, when the clamping means is collapsed for assisting in forcing the frames toward each other, so that the device will thus provide a small thin and compact package for storage or for shipment To the attainment of the foregoing the improvement consists in the construction, combination and operative association of parts, such as is set forth in the following description, illustrated in the accompanying drawings and pointed out with particularity in the appended claims.

In the drawings:

Figure 15 is a plan view of a still further modification.

Figure 16 is an edge view thereof.

Figure 17 is an edge view of a still further modification.

Figure 18 is a fragmentary elevation to illustrate a different form of combined spring expansion member and lamp bulb hanger.

Figure 1:
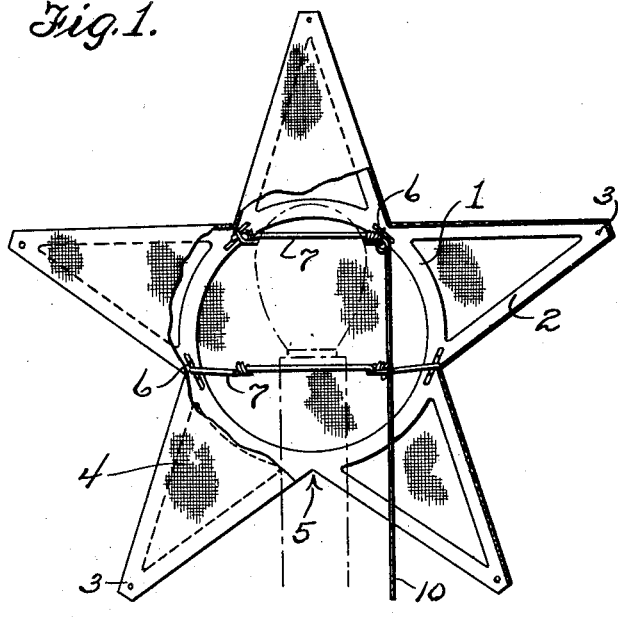
Figure 1 is a face view of one form of the improvement.
Figure 2:
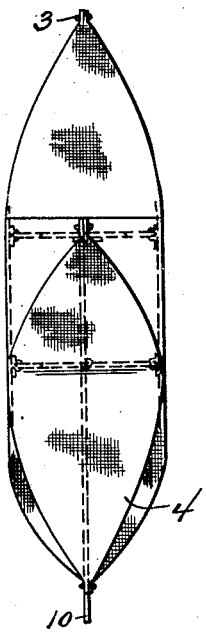
Figure 2 is an edge view thereof.
Figure 3:
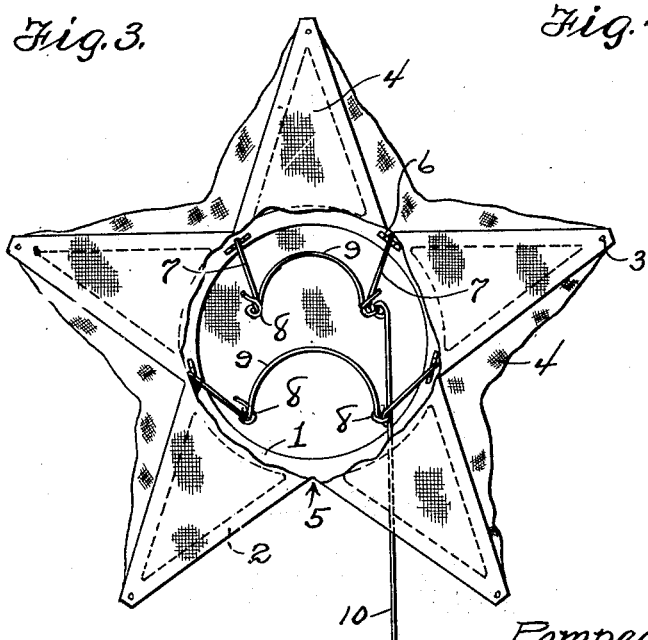
Figure 3 is a view similar to Figure 1 but showing the device collapsed.
Figure 4:
Figure 4 is an edge view of the device as illustrated by Figure 3.
Figure 5:
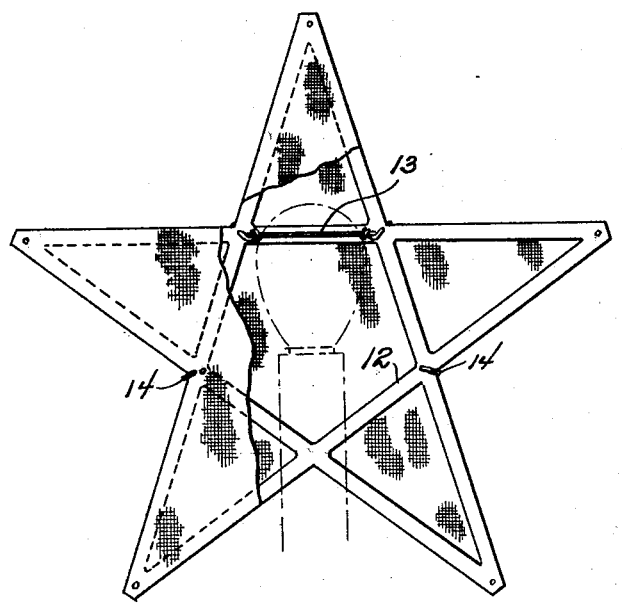
Figure 5 is a view of a second form of the invention.
Figure 6:
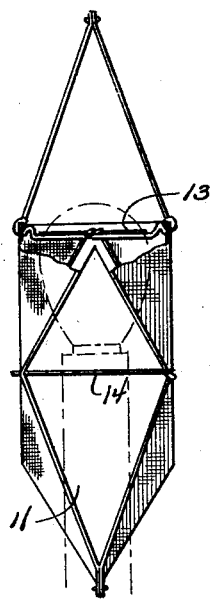
Figure 6 is an edge view thereof with parts broken away and parts in section.

In the showing of Figures 1 to 4 of the drawings it will be seen that I employ two frame members which are similarly shaped and constructed. These frame members may be formed of stiff cardboard or light metal. Each of the frame members includes a central annular portion 1 provided at equidistantly spaced intervals with spaced pairs of extending arms 2 which are inclined toward each other and meet at their outer ends. Thus it will be noted that the frame members are star-shaped, and the outer or apex portions of the points of the star-shaped frame are loosely or pivotally connected together, as at 3. The frame sections naturally assume a flat condition. The outer facing including, of course, the edges of the frame members, are covered by a sheet of translucent fabric 4. The fabric may be of paper, colored cloth or the like. A portion of the fabric is left open between two of the points of the star-like frame, as indicated by the numeral 5 in Figure 2 of the drawings whereby access may be had to the interior of the frame. The confronting faces of the central or annular body portion of the frame sections have secured therein wire members that are looped to provide the same with eyes 6. The eyes are arranged in spaced upper and lower pairs and to each of the oppositely arranged pairs of eyes there are hingedly connected the ends of spring wire rods of a construction best illustrated by Figures 9 to 12 of the drawings. These rods 7 are each rounded or coiled on themselves, as at 8, the said coils being interengaging and providing a hinged connection between the rods.

From the hinged connection the rods are continued in semi-circular formation, as indicated by the numeral 9. The hingedly connected rods and their semi-circular portions provide both the spreader members for the frame sections, as well as clamps for supporting the shade on lamp bulbs. In the mentioned showing of Figures 1 to 4 of the drawings the eye hinge for the upper clamp has loosely connected thereto a rod 10 which is guided through the eye of the lower clamp. This rod 10 serves as a means whereby the spring clamps may be brought to spread condition, as when the shade is expanded or to collapsed position as when the shade is folded, as disclosed by Figures 2 and 3 of the drawings.

In Figures 5, 6, 7 and 8 the frame construction and the covering therefor is substantially similar to that just described, except that the central portions of the frame sections, instead of being annular are hexagonal, being formed with the arms that provide the peak of the star-shaped shade, the translucent covering for the frame sections being, of course, provided with an opening between two of the peaks of the star-shaped figures. For distinction this opening is indicated by the numeral 11 in Figure 6 of the drawings, and also for distinction, the central member of the frame sections is indicated by the numeral 12. The upper central bar of the frame sections has pivotally secured thereto the ends of spreader rods and lamps clamps similar to those previously described and, therefore, broadly indicated by the numeral 13. One of the frame sections in a line with and directly opposite the opening 5, has pivotally or loosely secured thereto the end of a wire rod 14, the second end of each of the rods 14 being offset and pointed, as at 15, and the pointed ends of the said rods are designed to be received through suitable apertures in the second frame section.

Figure 7:
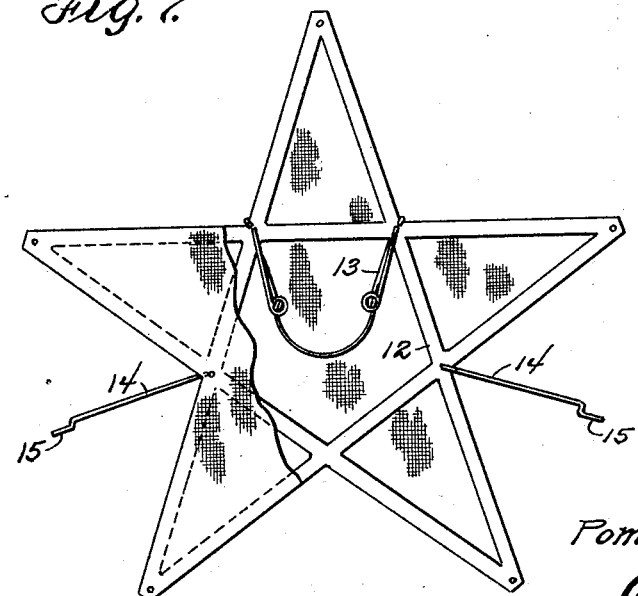
Figure 7 is a view similar to Figure 1, with the parts collapsed or folded.
Figure 8:
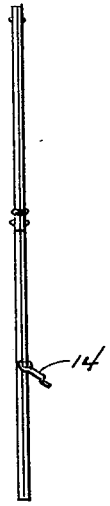
Figure 8 is an edge view of a device as illustrated by Figure 7.
Figure 9:
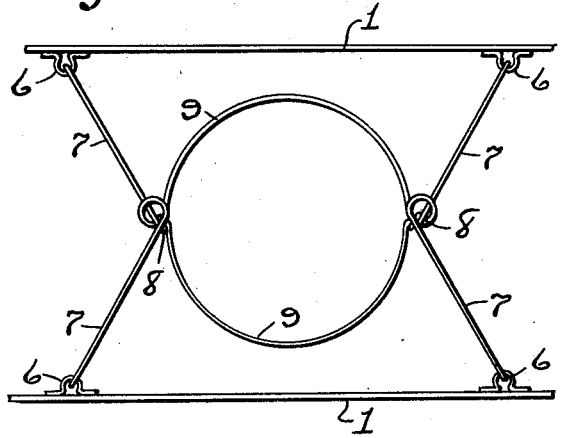
Figure 9 is a plan view of a modified form of a combined frame expanding member and lamp bulb clamp.
Figure 10:
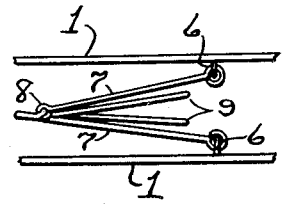
Figure 10 is a detail plan view of the construction illustrated by Figure 9, when partly collapsed or folded.
Figure 11:
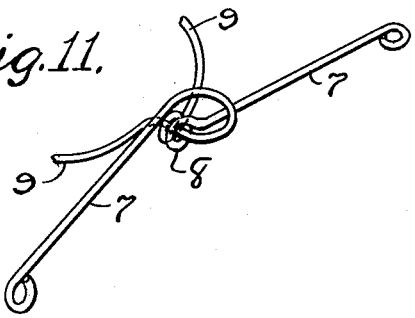
Figure 11 is a fragmentary perspective view to illustrate the hinged connection between the central semi-circular portions of the clamps and the arms therefor.
Figure 12:
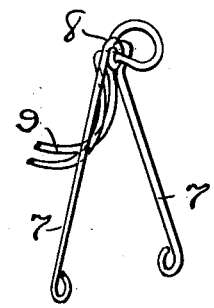
Figure 12 is a similar view showing the clamps partly collapsed or folded.

The rods 14 thus provide spreader members for the frame sections so that access may be obtained to the combined lamp bulb clamp and spreader member 13 so that the same can be moved to either spread or folded position to permit of the spreading of the frame sections and the fabric thereof when the frame is in use and to likewise permit of the collapsing of the frame sections and the fabric thereof when the hook carrying rods are brought to inactive position as illustrated by Figures 7 and 8 of the drawings.

Figure 13:
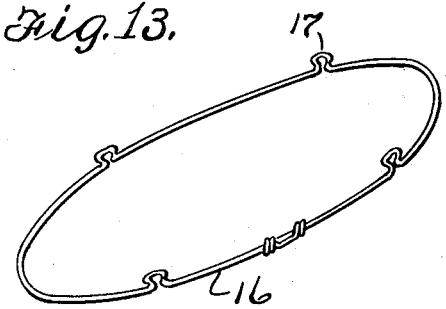
Figure 13 is a perspective view of a wire ring member which may be employed.
Figure 14:
Figure 14 is a similar view of one of the eyes with which the hooked arms of the clamp engage.

In Figure 15 the frame sections are shaped as described in connection with Figures 1 to 4 and are connected and covered in the same manner. The central annular portion of these frame members have secured on the confronting faces thereof a wire ring member 16 which is best disclosed by Figure 13 of the drawings. The ring member is provided with oppositely disposed upper and lower pairs of eyes 17, the same being formed by bending the ring member. These eyes are engaged by the eye or hooked ends of the arms of a combined lamp clamp and frame spreader member similar to those previously described. The fabric body in this instance has its top provided with an opening so that a lamp bulb 18 may be inserted therein, and also whereby the operator can swing the combined spreader members and clamps to bring the same into active engagement with the sides of the lamp bulb to support the shade thereon and to likewise spread the frame sections and the fabric cover therefor.

In Figure 17 the construction is substantially similar to that previously described except that the sides of the frame are provided with collapsible extensions 19 (dotted lines) and the fabric covering extending over these pointed extensions. The space between the frame and the translucent covering between two of the points of the star-shaped frame is provided with an opening 20 whereby the combined spring lamp bulb clamps and frame extenders may be reached so that the same can be either spread or folded.

In Figure 18 the combined lamp bulb clamp and frame section spreaders is in the nature of a light convolute spring 21, the ends of which, of course, are secured to the center of the frame sections and the lamp bulb 22 is designed to be engaged between the central convolutions of the spring.

Figure 19:
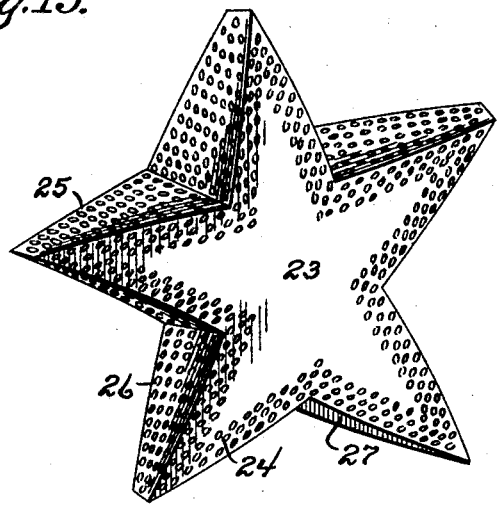
Figure 19 is a perspective view of another modified form of the invention.

In Figure 19 of the drawings, the shade is formed of a pair of star-shaped panels 23 which are perforated as shown at 24 to provide light passages, the central imperforate portions of the panels being shown in the form of a star, although it is obvious that these portions of the panels may assume other shapes and configurations. The marginal edges of the panels 23 are connected by walls 25 which taper outwardly or toward the points of the star and are likewise perforated as indicated at 26 to provide light passages.

A portion of the wall 25 is omitted to provide an opening 27 through which the lamp or bulb may be inserted and the shade may be mounted upon this lamp or bulb in any suitable manner, such for example as that previously shown and described.

Figure 21:
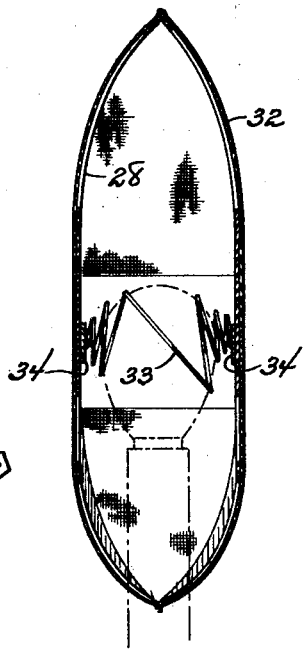
Figure 21 is a section on the line 21—21 of Figure 20.
Figure 20:
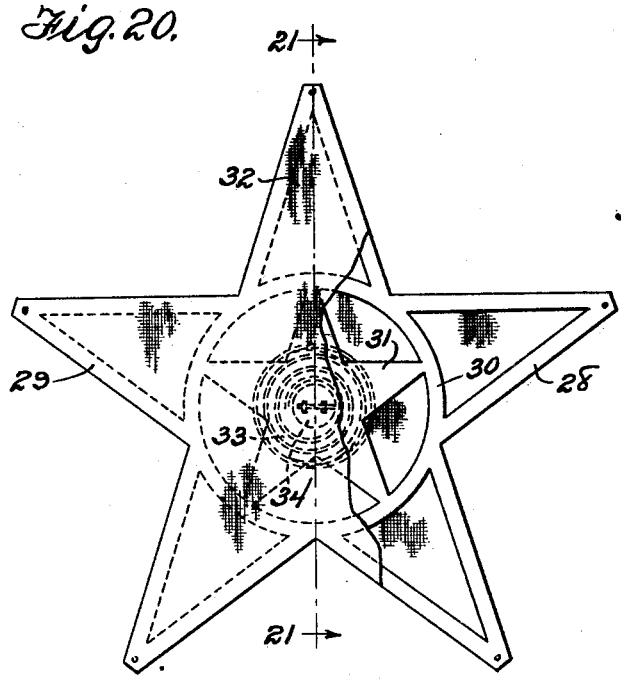
Figure 20 is an elevation of still another form with parts broken away.

In the form of the invention shown in Figures 20 and 21, the shade is formed of spaced star-shaped frames 28 which are connected at their points as indicated at 29. The frames 28 include central annular members 30 to which are connected the points of star-shaped members 31 so that these members 31 provide an ornamental configuration within the annular portions 30 of the frame and leave openings for the passage of light. The frames are covered with a translucent covering 32 through which the light may pass, so that the outline of the inner star-shaped members will be defined, as well as the outer star-shaped frame.

Located within the shade is a resilient member 33 which is formed of a plurality of convolutions whose diameter decreases from the center outward in opposite directions. The outer restricted ends of the resilient member 33 are connected to the stars 31 as shown at 34, while the intermediate portion of this member is adapted for engagement with an incandescent bulb. The member 33 thus serves to yieldingly force the sides of the shade apart as well as to engage the bulb, while the star-shaped members 31 act to provide a means of attachment as well as to increase the ornamental appearance of the shade.

My improvement is of an extremely simple construction which may be cheaply manufactured and marketed. The device is highly ornamental and may, as previously stated, be readily collapsed into a small flat package for storage or for shipment when not required for use. Also the improvement may be employed as a tree ornament during the Christmas festivities or as a shade for an ordinary electric lamp. It is believed the advantages of the construction will be appreciated and that a further detailed description will not be required although I do not wish to be restricted to the specific structure herein set forth and, therefore, hold myself entitled to make such changes therefrom as fairly fall within the scope of what I claim.

Having described the invention, I claim:

1. An ornamental lamp shade comprising a pair of star-shaped frames connected at the extremity of their points and provided with a central opening, an ornamental member arranged within the opening to partly close the same, a resilient member having its opposite ends bearing against the ornamental members to force the frames relatively outward and to provide means to frictionally engage a lamp bulb to support the frame therefrom, and a translucent cover for the frames.

2. A frame for ornamental lamp shades comprising two star-shaped frame members having their points connected, a coil spring connected to the frames at the center thereof for forcing the frames away from each other, said spring having centrally spread and enlarged coils to receive therebetween and to frictionally contact with a lamp bulb for supporting the frame on such bulb.

3. A frame for ornamental lamp shades designed to be supported on a lamp bulb and comprising two skeleton star-shaped members having their points hingedly connected, each of said frame members having a central ring portion connecting the points thereof, and small stars having the extremities of their points connected with the ring portions and a coil spring having reduced ends secured centrally to the small stars for forcing the frames away from each other and for likewise frictionally engaging a lamp bulb for supporting the frame on such bulb.

In testimony whereof I affix my signature.

POMPEO CAPOCCI.